United States Patent
Hoppenstein

(10) Patent No.: US 7,246,089 B2
(45) Date of Patent: Jul. 17, 2007

(54) LIABILITY MANAGEMENT METHOD

(76) Inventor: Joel D. Hoppenstein, 17106 Ryton La., Boca Raton, FL (US) 33496

( * ) Notice: Subject to any disclaimer, the term of this patent is extended or adjusted under 35 U.S.C. 154(b) by 761 days.

(21) Appl. No.: 10/170,421

(22) Filed: Jun. 14, 2002

(65) Prior Publication Data

US 2003/0233298 A1 Dec. 18, 2003

(51) Int. Cl.
G06Q 40/00 (2006.01)

(52) U.S. Cl. .............. 705/35; 705/36; 705/37; 705/4; 705/40

(58) Field of Classification Search ............ 705/35, 705/36, 2, 8, 4, 40, 37; 434/107
See application file for complete search history.

(56) References Cited

U.S. PATENT DOCUMENTS

| | | | |
|---|---|---|---|
| 4,750,121 A * | 6/1988 | Halley et al. ........... | 705/35 |
| 5,136,502 A | 8/1992 | Van Remortel et al. | |
| 5,191,522 A * | 3/1993 | Bosco et al. ........... | 705/4 |
| 5,429,506 A * | 7/1995 | Brophy et al. .......... | 434/107 |
| 5,991,733 A | 11/1999 | Aleia et al. | |
| 5,991,744 A * | 11/1999 | DiCresce .............. | 705/36 |
| 6,044,352 A | 3/2000 | Deavers | |

OTHER PUBLICATIONS

Proquest—Bork, Robert "Briefing" Colorado Springs Gazette—Telegraph, Colorado Springs, Colo.: Oct. 8, 1988, p. C. 14 {proquest ID 242262891}.*

* cited by examiner

Primary Examiner—James Kramer
Assistant Examiner—Harish T. Dass
(74) Attorney, Agent, or Firm—Morrison & Foerster LLP

(57) ABSTRACT

Disclosed are methods of managing potential liabilities. The method can allow participants to pool their funds in order to pay off pending and future liabilities and can allow participants to shield funds for paying off liabilities from other operational costs.

20 Claims, 1 Drawing Sheet

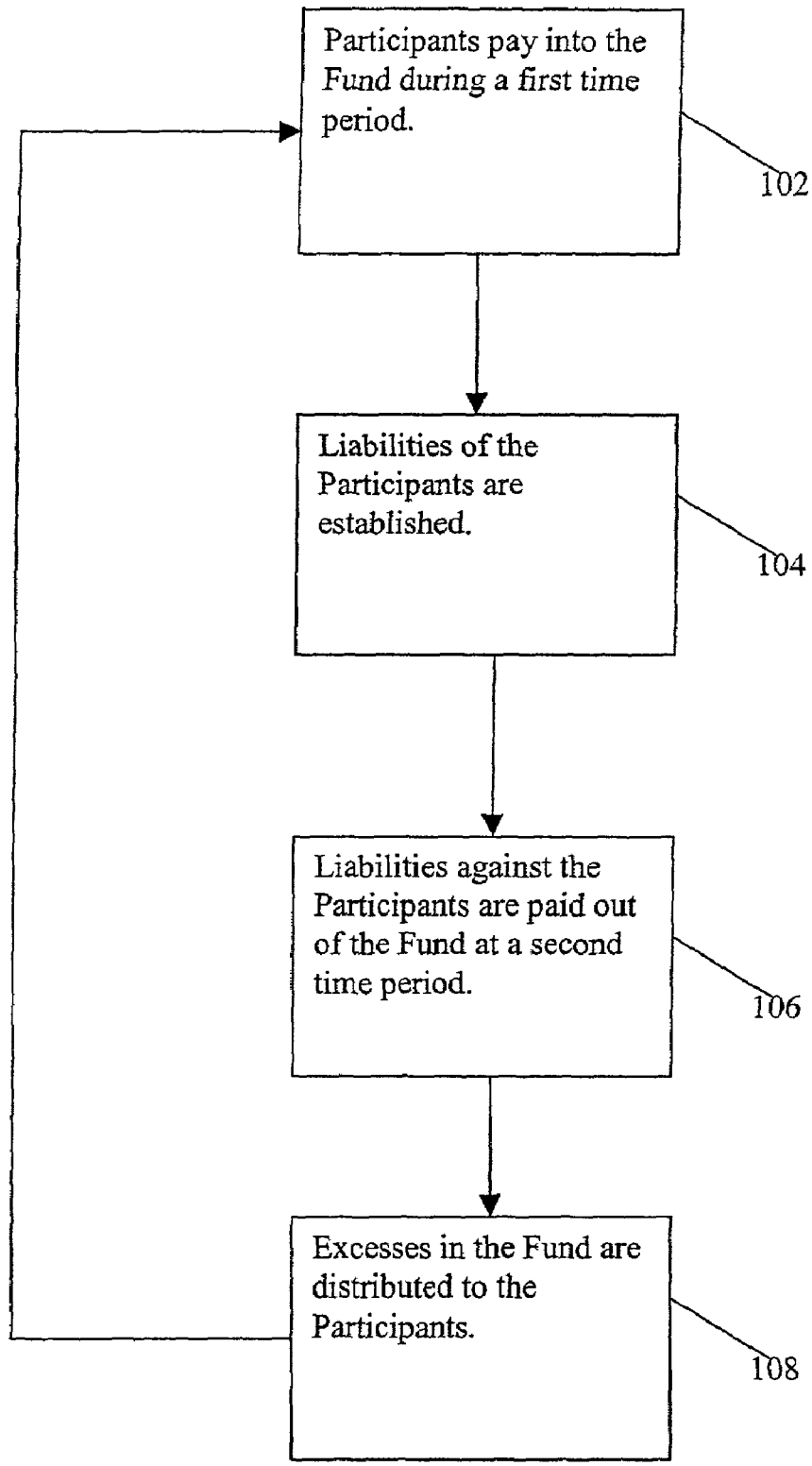
FIGURE

LIABILITY MANAGEMENT METHOD

FIELD OF THE INVENTION

This invention relates to a method of managing potential liabilities. Specifically, the method allows participants to pool their funds in order to pay off pending and future liabilities.

BACKGROUND OF THE INVENTION

Currently, many industries are faced with the potential for huge reoccurring liabilities against them. For example, the tobacco industry has already entered into settlements with all the states to pay for injuries caused by smoking.

Another industry facing huge reoccurring liabilities against them is the Health Maintenance Organization (HMO) industry. Currently, Congress is debating a Patient's Bill of Rights (PboR) that will increase the potential liability of managed care providers. The passage of the PboR will increase the expenses of HMOs, which will increase the cost of managed care to the public. Some estimates of the increase in cost of managed care as a result of the PboR are as high as 15%–25%. These high estimates can be attributed to the fact that only a portion of any price increase will go to paying for PboR related costs.

In the HMO industry the Industry and Wall Street investment bankers have termed the costs attributed and assigned to providers, for example, doctors, hospitals and pharmaceutical providers the "Medical Loss Ratio." In reality, the Medical Loss Ratio is dependent upon the amount of money the HMO is taking in per member. Accordingly, as the HMOs raise their fees to members to pay the costs of the PboR, providers can raise the price they charge HMOs in a proportional amount. In this manner, what happens is only a fraction of money the HMO takes in as a result of raising the fees can be used for paying off liabilities. Accordingly, a method is needed to allow funds that are needed to pay for additional liability costs to go more directly to paying for the additional liabilities.

SUMMARY OF THE INVENTION

Disclosed are methods of managing potential liabilities. The methods provide for a fund from which the liabilities are paid. The methods can allow participants to pool their funds in order to pay off pending and future liabilities and can allow participants to shield funds for paying off liabilities from other operational costs.

In one embodiment, the method comprises paying into a fund during an accounting period, establishing liabilities against participants of the fund during the accounting period, and paying out of the fund the established liabilities at the end of the accounting period. Excesses in the fund at the end of the accounting period are distributed to the fund's participants at the end of the accounting period after the established liabilities are paid.

Preferably, the participants of the fund pay into the fund at the beginning or during the accounting period. Preferably, each of the participants has members. Preferably, the established liabilities are paid to one or more members. Preferably the members of the participants pay the participants who, in turn, pay into the fund at the beginning or during the accounting period. Preferably, the participants comprise Health Maintenance Organizations. Preferably, each participant of the fund pays into the fund at the beginning or during the accounting period an amount that is dependent upon the number of members of the participant or each participant pays into the fund on a periodic basis.

Preferably, the amount paid into the fund by each participant is not dependent upon previous liabilities against the participant. Preferably, a committee establishes the liabilities that are paid out of the fund. Preferably, the established liabilities against participants includes litigation costs. Preferably, interest is accrued on the fund during the accounting period. More preferably, the interest accrued is used to pay the costs of maintaining the fund.

In another embodiment, the method comprises providing a fund, arranging for participants to pay into the fund during a first period of time, paying out of the fund established liabilities of the fund participants during a second period of time, and distributing to participants of the fund excesses in the fund.

BRIEF DESCRIPTION OF THE DRAWINGS

The invention will be better understood by reference to the Detailed Description of the Invention when taken together with the attached FIGURE of a flow chart of one embodiment of the invention.

DETAILED DESCRIPTION OF THE PREFERRED EMBODIMENTS

The present invention is a method of managing potential liabilities of participants. The method can allow participants to pool their funds in order to pay off pending and future liabilities and can allow participants to shield funds for paying off liabilities from other operational costs.

Participants of the fund can comprise any entities that share a common type of threat of liability. Such a common threat may, for example, be entities in the same type of business; entities that are exposed to liability under a common type of law; or entities that are defendants in a common type of law suit (such as a class action law suit).

The Figure is a flow diagram showing one embodiment of the invention. The Figure shows a single fund cycle 102, 104, 106 and 108. This cycle preferably repeats itself. Preferably, each fund cycle represents a single accounting period.

In the Figure, during a first time period participants pay into the fund at 102. The payments into the fund during the first time period may be all at once or periodically., e.g. monthly. The amount paid into the fund can be the same for each participant or the amount of money each participant pays into the fund can vary depending on a variety of factors. Factors that can be used for determining the amount of money that each participant pays into the fund can include, for example, the relative size of each participant, the past liabilities of each participant, and the projected future liabilities of each participant. Preferably, the amount of money paid into the fund by each participant varies only with the relative size of the participant and not on the past liabilities or projected future liabilities of the participant. For a participant such as an HMO, the size of each participant can be the number of members/customers each participant has. For example, each participant may pay a predetermined amount of money into the fund for each member the participant represents.

The date that participants pay into the fund may be a rigid date prior to establishing the liabilities of the participants at 104. Alternatively, the date the participants may pay into the fund may be made flexible to reflect participant changes prior to establishing liabilities at 104, paying out liabilities at 106 and distributing excesses at 108. Under the flexible approach, participants may initially pay into the fund at a first time period 102 an amount that reflects the size of the participant at that time period. If the participant grows, i.e. adds new members prior to the establishment of liabilities at 104, paying out liabilities at 106, or distributing excesses at 108, the participant may be required to pay additional money into the fund to reflect these changes.

Once participants have paid into the fund, the liabilities of the participants can then be determined at 104. Preferably, the fund is established only to pay certain liabilities of the participants. These liabilities can include, for example, specific types of court judgments, settlements related to specific types of conduct and/or conduct related to specific legislation. Preferably the entity seeking payment for the liability has exhausted all independent review/appellate processes or has agreed to a settlement with a participant prior to submitting the liability to the find for payment.

Preferably, the fund has a committee that establishes the liabilities that are to be paid by the fund at 104. The committee can determine which liabilities will be paid out of the fund. The committee may determine, for example, if the liability is of the type paid by the fund. The committee may also determine the fairness of the liability amount. For example, for settlements, the committee may choose to modify the settlement amount. The committee can comprise employees of the participants, or the committee may be separate from the participants. Preferably, the members of the committee are selected by the participants.

Once which liabilities are to be paid are established, the liabilities are paid out of the fund at a second time period 106. Preferably, the second time period is at a predetermined time at the end of an established accounting period. This established accounting period may, for example be annual, semiannual, or quarterly.

After all of the liabilities are paid out at the beginning or end of the second time period 106, excess money in the fund is distributed back to the participants at 108. The excess may comprise all remaining assets of the fund, or the excess may comprise an amount greater than a certain amount in the fund. Preferably, the excess is proportionately distributed to the participants. For example, the excess may be distributed back to the participants in proportion to their total contribution to the fund during the first time period. Alternatively, the excess may be distributed back to the participants in proportion to their relative size at the end of the accounting period.

Once the excess is distributed back to the participants at 108, the process preferably cycles back to 102 with the participants paying back into the fund. The fund may distribute all of the excess back to the participants at 108, or the find may use the excess as credit towards the participants payments into the fund during the next fund cycle.

Preferably the cost for maintaining the fund is paid out of the fund's float (the interest earned by the fund from its invested income, prior to disbursement at the second time period). By paying the costs for maintaining the fund, for example the fund manager's fee, using the float, 100% of the fund's principal can be used to pay off the participant's liabilities and/or returned to the participants.

The mechanics of the fund can be illustrated in relation to the HMO industry.

HMO EXAMPLE

The fund according to this invention has almost immediate applicability to The HMO industry, an industry facing imminent legislative action and ongoing litigation. Given its immediacy, the HMO industry is the model used herein to illustrate how tort reform, aimed at all, one or some industries might impact that industry. A Fund (the term Fund used herein refers to a Fund according to this invention) can be used to compensate victims, while providing additional income for the HMO. This additional income stream can be used to reduce the consumer price of healthcare, increasing competition while driving up HMO profits.

William M. Mercer Inc., a New York consulting firm specializing in employee benefits determined that HMO coverage cost $3,713 per person in 2000, or $309.42/person/month. Preferred Provider Organizations (PPOs) where patients can be treated by health professionals outside the plan, cost an average of $4,032/person/annum, or $336/person/month.

In 2001 the Congressional Budget Office (CBO), determined that the HMOs implementation and maintenance costs for The Patients' Bill of Rights (PboR) under an average HMO Plan would increase the costs of the HMO plans by 4.2% under the Kennedy Bill or 2.9% under the Frist Bill, which is substantially similar to what has become the House Bill. Assuming that the final law is a mix of the Senate and House Bills, the average increased cost of an HMO plan under the PboR will be $3.55%.

According to a January 2002 Washington Post column by David Broder HMO premiums rose 11% in 2001 and are expected to climb 14–15% in 2002. Taking the 2000 HMO member annual premiums from above and adding the 2001 and 2002 expected annual premium increases we get $3,713×11%×15% $4,739.64 for the average HMO member annual premium in 2002. The average 2002 PPO member premium will increase from the 2000 annual premium number of $4,032/member to $4,032×11%×15%=$5146.88.

In Wellpoint Health Networks 2001 Annual Report it states that 65% of its members are in PPO Plans. For purposes of this example, it is assumed that the HMOs only have 25% of their member in PPOs. Using the HMO average annual premium of $4,739.64 weighted 75% and the PPO Members average premium weighted 25% a blended HMO Industry average annual members premium of $4,841.45 is obtained.

Then multiplying the average increase cost of the PboR, as determined above, to the blended HMO Industry average annual premium we get an average annual PboR/member cost of $171.87 or $14.32/member/month.

In addition to the costs associated with the PboR, an additional cost for HMOs in 2002 are the charges pertaining to the Medical Privacy Rules. In 2000 the President enacted the Medical Privacy Rules, which, according to William H. Mercer Inc., will cost the HMOs a further $1.50 per month. Adding the $1.50 cost of the Medial Privacy Rules to the cost of the PboR/month produces a combined 2002 Health Care Cost Increase of $15.82/HMO member/month. For this example, although the litigation costs are included in the CBO figures, it was decided to increase this PboR+Medical Privacy Rules monthly amount totaling $15.82/HMO member by $0.18 increasing this Health Care Provider cost figure to $16/member/month eliminating all uncertainty.

Many, if not all, of the HMOs have already, provided for these costs. However, the HMOs should be entitled to pass on the additional costs of the PboR to their members. Industry reimbursement, a unique feature of the Fund, enables the industry to comply with the changes in the health care laws without being placed in a precarious financial situation.

Currently, the profit margins in the HMO industry are razor thin, leaving very little room for innovation and additional services without raising prices. As an example UnitedHealth Group Inc. (UNH), a very profitable and well-run HMO, has annual profit margins of $73.29/member or $6.11/month, with the members paying an average of $4,841.45/annum or $403.45/month. Thus UNH's present net earnings margin is $0.015 or one and a half cents/member/annum.

The $15.82/member/month Medical Care Provider Cost when put in the context of UNH's $6.11/member/month profit leads to a loss of $9.71/member/month. Thus, when isolated and assuming no price increase, after the enactment of the PboR and the Medical Privacy Rules UNH will have a loss of $156,331,000.

Medical Loss Ratios, a key HMO profitability indicator that measures the percentage of revenues spent on medical costs such as payments to doctors, hospitals and pharmaceutical services will also be under additional pressure from provisions in the PboR.

The Fund allows for participants to pay off liabilities from a Fund that is kept separate from other operating costs of the participants. In reality in the HMO industry providers typically adjust the Medical Loss Ratio in proportion to the HMOs' revenues. The actual value of the Medical Loss Ratio is dependent upon the amount of money the HMO is taking in per member. Accordingly, as the HMOs raise their fees to members to pay the costs of the PboR and the Medical Privacy Rules, providers will raise the price they charge the HMOs in a proportional amount. In this manner, only a fraction of the money the HMO takes in as a result of raising the fees can be used for paying off liabilities. Under the Fund of this invention, the additional money taken in by the HMOs is kept separate, in the Fund, away from the HMOs' other assets. Since this money is not the HMOs until the excess of the Fund is distributed to the participants, up to 100% of the additional money taken in by the HMOs may be used by the HMOs to pay off liabilities.

Without the Fund, to avoid falling into the red, HMOs will have to raise prices rather steeply, some estimating price increases ranging between 15–25%. Therefore, without an innovative way to tackle the rising medical costs of the PboR, the PboR will have the exact opposite effect of its intention, leading to HMOs skimping in the areas not covered by the PboR due to their margins being restricted further and thereby leading to a downward spiral in Health Care quality.

Even after creating a Fund prices may rise by the same amount as without the Fund in the first year, however, future years should see health care cost increases significantly reduced if not eliminated entirely, due to the increased profits the Fund will generate and the effects of competition the Fund will stimulate and encourage.

The Fund provides the HMOs with a way to boost their margins exponentially, increasing prices at a fraction of what CALPERS (25%) and others (15%) anticipate. In fact, assuming a 2002 blended HMO/PPO rate of $4,841.45/member/annum and a $16/member/month increase as a direct result of the establishment of the Fund a price increase of only 4% is required to fully fund the Fund.

After the Fund's implementation, as will be shown, profits can increase dramatically, allowing individual HMOs to drive prices down even further. Thus, as can be seen, the Fund can promote competition and can create lower pricing.

Each individual HMO, or HMOs signatories to the Fund or an HMO participant of the HMO Industry Coalition, if the Coalition is a signatory of the Fund, will pay a set amount per member per month into the Fund. (Of course what constitutes a member is subject to definitional agreement by the HMO industry Coalition or HMO grouping of signatories or an individual HMO signatory to the Fund). For this example, it is assumed that the amount of money each individual HMO member will pay into the Fund will be $16/month, which is consistent with the amount of money each member will pay without the fund, as determined above.

Furthermore, for this example, each quarter, the HMO participants of the Fund will have their membership audited and adjusted, as Fund reimbursement also depends on membership numbers. This Fund is designed to reimburse the HMO(s) for the costs incurred in offering their members the additional services required under the PboR and Medical Privacy Rules and added litigation costs. From time-to-time the monthly HMO payments into the Fund may be increased due to inflationary pressures. However, these increases can be capped at Fund Formation by limiting these increases to the annual increases in the CPI Index. The Fund will pay all individual members of HMOs obtaining final judgments or settlement agreements against their respective HMOs, which individual HMO signatory to the Fund or HMO participant brings to the Fund for payment; assuming that said HMO is a signatory to the Fund. If a member of a HMO has prosecuted a suit vigorously and exhausted all appeals and all injuries sustained by the HMO member falls under the rules of the Fund, it also is possible for an individual HMO member to obtain relief from the Fund via settlement pre-litigation and/or final judgment.

Under a settlement after an HMO member has exhausted his independent review appellate process and/or the HMO decides to settle the action, the matter will be brought to the Legal-Medical Committee of the Fund, who will, after making a determination as to the fairness of the settlement will either agree to the settlement, reduce it or increase it. If the HMO member and the HMO agree with the Funds Legal-Medical Committee decision the Fund will be in a position to pay the HMO member and such payment shall occur either at the beginning or at the end of the next accounting period. If there is no agreement, the HMO member can seek redress in the courts. Any HMO, who has repeated legal judgments or pre-final judgment Fund approved settlements entered against it and paid by the Fund will run the risk of expulsion from the Fund, or some other, lesser form of punishment, such rules to be determined by the Fund signatories at or prior to Fund Formation.

During any and all accounting periods, all monies paid into the Fund by the HMO signatory/ies to the Fund will preferably be invested in Treasury Bills and other money market instruments of a like duration issued by top tier financial institutions as rated by the ratings agencies, for example, Fitch and/or Moodys. All judgment and/or settlement amounts to be paid by the Fund will only take place at the end of each accounting period. At the end of the agreed upon accounting period, monies not disbursed to pay for final judgments brought against an individual HMO, and for suits settled before or during the legal process, agreed to by the Fund Litigation Committee, will be disbursed to the individual HMO(s), participants of the Fund. The Fund money so disbursed to each HMO participant of the Fund will be in the proportion to that HMO's membership relative to the HMO Fund's total membership for all the HMOs at the end of the accounting period. In other words, if an HMO, has a thousand members and the combined membership of all the HMOs in the Fund, at the end of the accounting period is 10,000, members then that particular HMO will receive a payment equating to 10% of the monies the Fund has not disbursed to individual claimants.

To ensure that Fund money paid into the Fund is, actually used in its entirety for Fund purposes, it is highly recommended that the Fund Manager(s) receive no fee. Rather, the Fund Managers fee will be the Funds "float," (the interest earned by the Fund from its invested incoming funds from the HMOs, prior to disbursements at the end of each accounting period). The amount of the "float" will be determined and dependent upon the agreed upon accounting period that the incoming monies will remain in the Fund and interest rates.

In order that the Fund income is not depleted and is therefore not available when needed, it is, again, highly preferred that all of these incoming funds be placed in Treasury Bills and/or Bank Certificates of Deposit-money market instruments, issued for the same duration as each of the Funds accounting periods. Acquiring T-Bills and money market instruments whose maturity dates match the accounting periods increases liquidity and eliminates most, if not all of the investment risk.

Claims to the Fund may be prosecuted through the U.S. Judicial system as per the Patients' Bill of Rights-if enacted. If not, the laws presently in force will prevail. However, a system of independent review will preferably be set-up in each HMO, with appeal to the Legal-Medical Committee of the Fund. If the U.S. Judicial system is utilized, then upon a final judgement being presented for payment or if there is a settlement pre-final judgment approved by the Legal-Medical Committee of the Fund, payment by the Fund will be authorized. It will also be possible to settle claims via the mechanism of independent review within the HMO and then the decision presented to the Legal-Medical Committee of the Fund for payment.

Turning to the practical application of the Fund and its mechanisms and the anticipated effects on its constituent member(s) we get the following results-based on the following assumptions:

As established above each HMO will pay $16/member/month into the Fund.

If The HMO Coalition, in its entirety, decides to join the Fund the Fund will have at least 100 million members. It is assumed the Fund has HMO members with a combined 100 million member enrollment.

In accordance with discussions with HMO industry representatives, member claims arising out of the PboR or the voluntary adoption of same, including litigation and all contingencies, will not cost the Fund's participants more than 10% of the monthly premium portion paid into the Fund.

Once claims are paid at the end of each accounting period, the balance will be paid to the participating HMO(s) in the proportion that their membership enjoys relative to the total membership of all of the HMOs using the Fund. These payments will reimburse the HMO(s) for the costs associated with The Patients' Bill of Rights and Medical Privacy Rules they will have adopted.

The effective tax rate is assumed to be 35%.

The Fund is anticipated to remain existent for, at least, 25 years.

For purposes of this illustrative example, inflation throughout this 25 year period is deemed to be zero, and all four HMOs maintain their membership numbers. (In reality, this Business Method Model encourages competition, since the more members an HMO, has the more money, by way of reimbursement they will receive, and the more uses they may have for this money, including more marketing and/or lower pricing, leading to market share gains and/or losses). The money in the Fund is solely to pay Fund related claims and thus the money is delivered to the HMOs, after paying all claims at the pre-tax income level).

What follows below is an analysis of the 25 year effect that creating a Fund will have on the four largest HMO companies, using the end of quarter results as of Mar. 31, 2002, and isolating the 25 year Fund effects, to more clearly illustrate the benefits which will accrue to the companies as a result of Fund implementation.

EXAMPLE UNITEDHEALTHGROUP (UNH)

At the end of the 2002 first quarter UNH had net income of $295 million. Extrapolating and assuming business conditions remain unchanged it is anticipated UNH will have earnings of, at least, $1.180 Billion for 2002. Utilizing Pro Forma numbers, assuming the Fund was operational from Jan. 1, 2002 based on the above assumptions, UNH could add annual net income in the $1.808 Billion range for 2002, (and all subsequent years of the Funds existence), creating a 2002 net income increase of 153%, taking total 2002 net income to $2,988 Billion. Assuming a Price-Earnings (P/E) Ratio of 25% the UNH increase in share price after the adoption of the Fund would be $1.808 Billion×25=$45.02 Billion. UNH's current market value is $27.96 billion, and thus with this $46.95 Billion Fund earnings addition the UNH market capitalization will grow to 72.98 Billion, a 261% increase in value.

What follows is an analysis of UNH's earnings and market value growth covering years 2–25 of the Fund's existence.

Year 2:
Market Value (MV) at beginning of year $72.98 Billion.
P/E multiplier at end of year from Fund $45.02 Bn.

Beginning *MV* (72.98 *Bn*)+*P/E* Multiplier ($45.02 *Bn*)=End of year *MV* $118 *Bn*

Year 3
Market Value (MV) at beginning of year $118 Bn.
P/E multiplier at end of year from Fund $45.02 Bn.

Beginning *MV* (118 *Bn*)+*P/E* Multiplier ($45.02 *Bn*)=End of year *MV* $163.02 *Bn*

Year 4:
Market Value (MV) at beginning of year $163.02 Bn.
P/E multiplier at end of year from Fund $45.02 Bn.

Beginning *MV* ($163.02 *Bn*)+*P/E* Multiplier ($45.02 *Bn*)=End of year *MV* $208.04 *Bn*

Year 5:
Market Value (MV) at beginning of year $208.04 Bn.
P/E multiplier at end of year from Fund $45.02 Bn.

Beginning *MV* ($208.04 *Bn*)+*P/E* Multiplier ($45.02 *Bn*)=End of year *MV* $253.06 *Bn*

Year 6:
Market Value (MV) at beginning of year $253.06 Billion.
P/E multiplier at end of year from Fund $45.02 Bn.

Beginning *MV* ($253.06 *Bn*)+*P/E* Multiplier ($45.02 *Bn*)=End of year *MV* $298.08 *Bn*

Year 7:
Market Value (MV) at beginning of year $298.08 Billion.
P/E multiplier at end of year from Fund $45.02 Bn.

> Beginning MV ($298.08 Bn)+P/E Multiplier ($45.02 Bn)=End of year MV $343.10 Bn Year 8:
Market Value (MV) at beginning of year $343.10 Bn.
P/E multiplier at end of year from Fund $45.02 Bn.

> Beginning MV ($343.10 Bn)+P/E Multiplier ($45.02 Bn)=End of year MV $388.12 Bn Year 9
Market Value (MV) at beginning of year $388.12 Bn.
P/E multiplier at end of year from Fund $45.02 Bn.

> Beginning MV ($388.12 Bn)+P/E Multiplier ($45.02 Bn)=End of year MV $433.14 Bn Year 10:
Market Value (MV) at beginning of year $433.14 Bn.
P/E multiplier at end of year from Fund $45.02 Bn.

> Beginning MV ($451.53 Bn)+P/E Multiplier ($45.02 Bn)=End of year MV $478.16 Bn Year 11:
Market Value (MV) at beginning of year $478.16 Bn.
P/E multiplier at end of year from Fund $45.02 Bn.

> Beginning MV ($498.48 Bn)+P/E Multiplier ($45.02 Bn)=End of year MV $523.18 Bn Year 12:
Market Value (MV) at beginning of year $523.18 Bn.
P/E multiplier at end of year from Fund $45.02 Bn.

> Beginning MV ($545.43 Bn)+P/E Multiplier ($45.02 Bn)=End of year MV $568.20 Bn Year 13:
Market Value (MV) at beginning of year $568.20 Bn.
P/E multiplier at end of year from Fund $45.02 Bn.

> Beginning MV ($568.20 Bn)+P/E Multiplier ($45.02 Bn)=End of year MV $613.22 Bn Year 14:
Market Value (MV) at beginning of year $613.22 Bn.
P/E multiplier at end of year from Fund $45.02 Bn.

> Beginning MV ($613.22 Bn)+P/E Multiplier ($45.02 Bn)=End of year MV $658.24 Bn Year 15:
Market Value (MV) at beginning of year $658.24 Bn.
P/E multiplier at end of year from Fund $45.02 Bn.

> Beginning MV ($658.24 Bn)+P/E Multiplier ($45.02 Bn)=End of year MV $$703.26 Bn Year 16:
Market Value (MV) at beginning of year $703.26 Bn.
P/E multiplier at end of year from Fund $45.02 Bn.

> Beginning MV ($703.26 Bn)+P/E Multiplier ($45.02 Bn)=End of year MV $748.28 Bn Year 17:
Market Value (MV) at beginning of year $748.28 Bn.
P/E multiplier at end of year from Fund $45.02 Bn.

> Beginning MV ($748.28 Bn)+P/E Multiplier ($45.02 Bn)=End of year MV $793.30 Bn Year 18:
Market Value (MV) at beginning of year $793.30 Bn.
P/E multiplier at end of year from Fund $45.02 Bn.

> Beginning MV ($793.30 Bn)+P/E Multiplier ($45.02 Bn)=End of year MV $838.32 Bn Year 19:
Market Value (MV) at beginning of year $838.32 Bn.
P/E multiplier at end of year from Fund $45.02 Bn.

> Beginning MV ($838.32 Bn)+P/E Multiplier ($45.02 Bn)=End of year MV $883.34 Bn Year 20:
Market Value (MV) at beginning of year $883.34 Bn.
P/E multiplier at end of year from Fund $45.02 Bn.

> Beginning MV ($883.34 Bn)+P/E Multiplier ($45.02 Bn)=End of year MV $928.36 Bn Year 21:
Market Value (MV) at beginning of year $928.36 Bn.
P/E multiplier at end of year from Fund $45.02 Bn.

> Beginning MV ($928.35 Bn)+P/E Multiplier ($45.02 $973.38 Bn

Year 22:
Market Value (MV) at beginning of year $973.38 Bn.
P/E multiplier at end of year from Fund $45.02 Bn.

> Beginning MV ($973.38 Bn)+P/E Multiplier ($45.02 Bn)=End of year MV $1,018.4 Tn Year 23:
Market Value (MV) at beginning of year $1,018.4 Tn.
P/E multiplier at end of year from Fund $45.02 Bn.

> Beginning MV ($1,018.4 Tn)+P/E Multiplier ($45.02 Bn)=End of year MV $1,063.42 Tn Year 24:

> Beginning MV $1,063.42 Tn+P/E Multiplier $45.02 Bn=End year MV $1,108.44 Tn

Year 25:

> Beginning MV $1,108.44 Tn+P/E Multiplier $45.02 Bn=End year MV $1,153.46 Tn

Over the 25 year time horizon, as illustrated, the Fund will enable UNH to grow its shareholder value from a Market Capitalization of $27.96 Bn to $1,153.46 Tn representing a growth in value of 4,125%, or an average of 165% a year. UNH for their most recent quarter saw earnings increase 28%, which is a phenomenal results. Without the Fund, it is possible that UNH will experience year over year growth of 28%. However, this great result pales in comparison with the Fund's 2002 Pro Forma 165% return.

EXAMPLE AETNA

At the end of the 2002 first quarter 15 million members. At the end of the first quarter AETNA had $64.9 million in net income. Extrapolating, based on its first quarter 2002 results AETNA should post net income in excess of $259.6 million for fiscal year 2002. Using the Fund, AETNA's 2002 Pro Forma Fund earnings would be approximately $1,684.80 Billion. Assuming a P/E Ratio of 25 AETNA's market value would increase by $42.12 Billion. Today, AETNA has a market capitalization of, almost 7 Billion. The Fund can take AETNA's market capitalization to $49.12 Billion in one year, equating to an increase in value in excess of 701%.

What follows is an analysis of AETNA's 25 year earnings and market capitalization.

Year 2:
Market Value (MV) at the beginning of year $49.12 Bn.
P/E Multiplier at end of year from Fund $42.12 Bn.

> Beginning MV ($49.12 Bn)+P/E Multiplier ($42.12 Bn)=End year MV $91.24 Bn

Year 3:
Market Value (MV) at the beginning of year $91.24 Bn.
P/E Multiplier at end of year from Fund $42.12 Bn.

> Beginning *MV* ($91.24 *Bn*)+*P/E* Multiplier ($42.12 *Bn*)=End year *MV* $133.36 *Bn*

Year 4:
Market Value (MV) at the beginning of year $133.36 Bn.
P/E Multiplier at end of year from Fund $42.12 Bn.

> Beginning *MV* ($133.36 *Bn*)+*P/E* Multiplier ($42.12 *Bn*)=End year *MV* $175.48 *Bn*

Year 5:
Market Value (MV) at the beginning of year $175.48 Bn.
P/E Multiplier at end of year from Fund $42.12 Bn.

> Beginning *MV* ($175.48 *Bn*)+*P/E* Multiplier ($42.12 *Bn*)=End year *MV* $217.60 *Bn*

Year 6:
Market Value (MV) at the beginning of year $217.60 Bn.
P/E Multiplier at end of year from Fund $42.12 Bn.

> Beginning *MV* ($217.60 *Bn*)+*P/E* Multiplier ($42.12 *Bn*)=End year *MV* $259.72 *Bn*

Year 7:
Market Value (MV) at the beginning of year $259.72 Bn.
P/E Multiplier at end of year from Fund $42.12 Bn.

> Beginning *MV* ($259.72 *Bn*)+*P/E* Multiplier ($42.12 *Bn*)=End year *MV* $301.84 *Bn*

Year 8:
Market Value (MV) at the beginning of year $301.84 Bn.
P/E Multiplier at end of year from Fund $42.12 Bn.

> Beginning *MV* ($301.84 *Bn*)+*P/E* Multiplier ($42.12 *Bn*)=End year *MV* $343.96 *Bn*

Year 9:
Market Value (MV) at the beginning of year $343.96 Bn.
P/E Multiplier at end of year from Fund $42.12 Bn.

> Beginning *MV* ($343.96 *Bn*)+*P/E* Multiplier ($42.12 *Bn*)=End year *MV* $386.08 *Bn*

Year 10:
Market Value (MV) at the beginning of year $386.08 Bn.
P/E Multiplier at end of year from Fund $42.12 Bn.

> Beginning *MV* ($386.08 *Bn*)+*P/E* Multiplier ($42.12 *Bn*)=End year *MV* $428.20 *Bn*

Year 11:
Market Value (MV) at the beginning of year $428.20 Bn.
P/E Multiplier at end of year from Fund $42.12 Bn.

> Beginning *MV* ($428.20 *Bn*)+*P/E* Multiplier ($42.12 *Bn*)=End year *MV* $470.32 *Bn*

Year 12:
Market Value (MV) at the beginning of year $470.32 Bn.
P/E Multiplier at end of year from Fund $42.12 Bn.

> Beginning *MV* ($470.32 *Bn*)+*P/E* Multiplier ($42.12 *Bn*)=End year *MV* $512.44 *Bn*

Year 13:
Market Value (MV) at the beginning of year $512.44 Bn.
P/E Multiplier at end of year from Fund $42.12 Bn.

> Beginning *MV* ($512.44 *Bn*)+*P/E* Multiplier ($42.12 *Bn*)=End year *MV* $554.56 *Bn*

Year 14:
Market Value (MV) at the beginning of year $554.56 Bn.
P/E Multiplier at end of year from Fund $42.12 Bn.

> Beginning *MV* ($554.56 *Bn*)+*P/E* Multiplier ($42.12 *Bn*)=End year *MV* $596.68 *Bn*

Year 15:
Market Value (MV) at the beginning of year $596.68 Bn.
P/E Multiplier at end of year from Fund $42.12 Bn.

> Beginning *MV* ($596.68 *Bn*)+*P/E* Multiplier ($42.12 *Bn*)=End year *MV* $638.80 *Bn*

Year 16:
Market Value (MV) at the beginning of year $638.80 Bn.
P/E Multiplier at end of year from Fund $42.12 Bn.

> Beginning *MV* ($638.80 *Bn*)+*P/E* Multiplier ($42.12 *Bn*)=End year *MV* $680.92 *Bn*

Year 17:
Market Value (MV) at the beginning of year $680.92 Bn.
P/E Multiplier at end of year from Fund $42.12 Bn.

> Beginning *MV* ($680.92 *Bn*)+*P/E* Multiplier ($42.12 *Bn*)=End year *MV* $723.04 *Bn*

Year 18:
Market Value (MV) at the beginning of year $723.04 Bn.
P/E Multiplier at end of year from Fund $42.12 Bn.

> Beginning *MV* ($723.04 *Bn*)+*P/E* Multiplier ($42.12 *Bn*)=End year *MV* $765.16 *Bn*

Year 19:
Market Value (MV) at the beginning of year $765.16 Bn.
P/E Multiplier at end of year from Fund $42.12 Bn.

> Beginning *MV* ($765.16 *Bn*)+*P/E* Multiplier ($42.12 *Bn*)=End year *MV* $807.28 *Bn*

Year 20:
Market Value (MV) at the beginning of year $807.28 Bn.
P/E Multiplier at end of year from Fund $42.12 Bn.

> Beginning *MV* ($807.28 *Bn*)+*P/E* Multiplier ($42.12 *Bn*)=End year *MV* $849.40 *Bn*

Year 21
Market Value (MV) at the beginning of year $849.40 Bn.
P/E Multiplier at end of year from Fund $42.12 Bn.

> Beginning *MV* ($849.40 *Bn*)+*P/E* Multiplier ($42.12 *Bn*)=End year *MV* $891.52 *Bn*

Year 22:
Market Value (MV) at the beginning of year $891.52 Bn.
P/E Multiplier at end of year from Fund $42.12 Bn.

> Beginning *MV* ($891.52 *Bn*)+*P/E* Multiplier ($42.12 *Bn*)=End year *MV* $933.64 *Bn*

Year 23:
Market Value (MV) at the beginning of year $933.64 Bn.
P/E Multiplier at end of year from Fund $42.12 Bn.

> Beginning *MV* ($933.64 *Bn*)+*P/E* Multiplier ($42.12 *Bn*)=End year *MV* $975.76 *Bn*

Year 24:
Market Value (MV) at the beginning of year $975.76 Bn.
P/E Multiplier at end of year from Fund $42.12 Bn.

> Beginning *MV* ($975.76 *Bn*)+*P/E* Multiplier ($42.12 *Bn*)=End year *MV* $1,017.88 *Tn*

Year 25:
Market Value (MV) at the beginning of year $1,017.88 Tn.
P/E Multiplier at end of year from Fund $42.12 Bn.

> Beginning *MV* ($1,017.88 *Tn*)+*P/E* Multiplier ($42.12 *Bn*)=End year *MV* $1,060 *Tn*

Thus, it can be seen that by using the Fund AETNA can grow its Market Capitalization from $7 Bn to $1,060 Tn over the initial 25 year period of the Fund, an increase in Market Capitalization of 15144%.

EXAMPLE CIGNA

At the end of the 2002 first quarter CIGNA had 14.2 million members. CIGNA had net income of $216 million. Extrapolating, for the 2002 fiscal year CIGNA should have earnings in the $864 million range. Using the Fund, Cigna can add $1.594 Billion to its 2002 fiscal year earnings. Assuming a P/E of 25 times, the Fund can grow CIGNA's market value by $39.861 Billion. Presently, CIGNA has a market capitalization of, almost $15 Billion. With the HMO Fund earnings increase the CIGNA market capitalization could grow to more than $54.861 Billion, a 366% increase in market value. What follows is a 25 year analysis of the effects of the Fund on CIGNA Market Capitalization.

Year 2:
Market Value (MV) at the beginning of year $54.861 Bn.
P/E Multiplier at end of year from Fund $39.861 Bn.

Beginning $MV$ ($54.861 $Bn$)+P/E Multiplier ($39.861 $Bn$)=End year $MV$ $94.722 $Bn$ Year 3:
Market Value (MV) at the beginning of year $94.722 Bn.
P/E Multiplier at end of year from Fund $39.861 Bn.

Beginning $MV$ ($94.722 $Bn$)+P/E Multiplier ($39.861 $Bn$)=End year $MV$ $134.583 $Bn$ Year 4:
Market Value (MV) at the beginning of year $134.583 Bn.
P/E Multiplier at end of year from Fund $39.861 Bn.

Beginning $MV$ ($134.583 $Bn$)+P/E Multiplier ($39.861 $Bn$)=End year $MV$ $174.444 $Bn$ Year 5:
Market Value (MV) at the beginning of year $174.444 Bn.
P/E Multiplier at end of year from Fund $39.861 Bn.

Beginning $MV$ ($174.444 $Bn$)+P/E Multiplier ($39.861 $Bn$)=End year $MV$ $214.305 $Bn$ Year 6:
Market Value (MV) at the beginning of year $214.305 Bn.
P/E Multiplier at end of year from Fund $39.861 Bn.

Beginning $MV$ ($214.305 $Bn$)+P/E Multiplier ($39.861 $Bn$)=End year $MV$ $254.166 $Bn$ Year 7:
Market Value (MV) at the beginning of year $254.166 Bn.
P/E Multiplier at end of year from Fund $39.861 Bn.

Beginning $MV$ ($354.166 $Bn$)+P/E Multiplier ($39.861 $Bn$)=End year $MV$ $294.027 $Bn$ Year 8:
Market Value (MV) at the beginning of year $294.027 Bn.
P/E Multiplier at end of year from Fund $39.861 Bn.

Beginning $MV$ ($294,027 $Bn$)+P/E Multiplier ($39.861 $Bn$)=End year $MV$ $333.888 $Bn$ Year 9:
Market Value (MV) at the beginning of year $333.888 Bn.
P/E Multiplier at end of year from Fund $39.861 Bn.

Beginning $MV$ ($333.888 $Bn$)+P/E Multiplier ($39.861 $Bn$)=End year $MV$ $373.749 $Bn$ Year 10:
Market Value (MV) at the beginning of year $373.749 Bn.
P/E Multiplier at end of year from Fund $39.861 Bn.

Beginning $MV$ ($373.749 $Bn$)+P/E Multiplier ($39.861 $Bn$)=End year $MV$ $413.61 $Bn$ Year 11:
Market Value (MV) at the beginning of year $413.61 Bn.
P/E Multiplier at end of year from Fund $39.861 Bn.

Beginning $MV$ ($413.61 $Bn$)+P/E Multiplier ($39.861 $Bn$)=End year $MV$ $453.471 $Bn$ Year 12:
Market Value (MV) at the beginning of year $453.471 Bn.
P/E Multiplier at end of year from Fund $39.861 Bn.

Beginning $MV$ ($453.471 $Bn$)+P/E Multiplier ($39.861 $Bn$)=End year $MV$ $493.332 $Bn$ Year 13:
Market Value (MV) at the beginning of year $493.332 Bn.
P/E Multiplier at end of year from Fund $39.861 Bn.

Beginning $MV$ ($493.332 $Bn$)+P/E Multiplier ($39.861 $Bn$)=End year $MV$ $533.193 $Bn$ Year 14:
Market Value (MV) at the beginning of year $533.193 Bn.
P/E Multiplier at end of year from Fund $39.861 Bn.

Beginning $MV$ ($533.193 $Bn$)+P/E Multiplier ($39.861 $Bn$)=End year $MV$ $573.054 $Bn$ Year 15:
Market Value (MV) at the beginning of year $573.054 Bn.
P/E Multiplier at end of year from Fund $39.861 Bn.

Beginning $MV$ ($573.054 $Bn$)+P/E Multiplier ($39.861 $Bn$)=End year $MV$ $612.915 $Bn$ Year 16:
Market Value (MV) at the beginning of year $612.915 Bn.
P/E Multiplier at end of year from Fund $39.861 Bn.

Beginning $MV$ ($612.915 $Bn$)+P/E Multiplier ($39.861 $Bn$)=End year $MV$ $652.776 $Bn$ Year 17:
Market Value (MV) at the beginning of the year $652.776 Bn.
P/E Multiplier at end of the year $39.861 Bn.

Beginning $MV$ ($652.776 $Bn$)+P/E Multiplier ($39.861 $Bn$)=End year $MV$ $692.637 $Bn$ Year 18:
Market Value (MV) at the beginning of the year $692.637 Bn.
P/E Multiplier at end of the year from $39.861 Bn.

Beginning $MV$ ($692.637 $Bn$)+P/E Multiplier ($39.861 $Bn$)=End year $MV$ $732.498 $Bn$ Year 19:
Market Value (MV) at the beginning of the year $732.498 Bn.
P/E Multiplier at end of the year $39.861 Bn.

Beginning $MV$ ($732.498 $Bn$)+P/E Multiplier ($39.861 $Bn$)=End year $MV$ $772.359 $Bn$ Year 20:
Market Value (MV) at the beginning of the year $772.359 Bn.
P/E Multiplier at end of the year $39.861 Bn.

Beginning $MV$ ($772.359 $Bn$)+P/E Multiplier ($39.861 $Bn$)=End year $MV$ $812.22 $Bn$ Year 21:
Market Value (MV) at the beginning of the year $812.22 Bn.
P/E Multiplier at end of the year $39.861 Bn.

Beginning $MV$ ($812.22 $Bn$)+P/E Multiplier ($39.861 $Bn$)=End year $MV$ $852.081 $Bn$ Year 22:
Market Value (MV) at the beginning of the year $852.081 Bn.
P/E Multiplier at end of the year $39.861 Bn.

$$\text{Beginning } MV \text{ (\$852.081 } Bn\text{)} + P/E \text{ Multiplier} \\ \text{(\$39.861 } Bn\text{)} = \text{End year } MV \text{ \$891.942 } Bn$$

Year 23:
Market Value (MV) at the beginning of the year $891.942 Bn.
P/E Multiplier at end of the year $39.861 Bn.

$$\text{Beginning } MV \text{ (\$891.942 } Bn\text{)} + P/E \text{ Multiplier} \\ \text{(\$39.861 } Bn\text{)} = \text{End year } MV \text{ \$931.803 } Bn$$

Year 24:
Market Value (MV) at the beginning of the year $931.803 Bn.
P/E Multiplier at end of the year $39.861 Bn.

$$\text{Beginning } MV \text{ (\$931.803 } Bn\text{)} + P/E \text{ Multiplier} \\ \text{(\$39.861 } Bn\text{)} = \text{End year } MV \text{ \$971.664 } Bn$$

Year 25:
Market Value (MV) at the beginning of the year $971.664 Bn.
P/E Multiplier at end of the year $39.861 Bn.

$$\text{Beginning } MV \text{ (\$971.664 } Bn\text{)} + P/E \text{ Multiplier} \\ \text{(\$39.861 } Bn\text{)} = \text{End year } MV \text{ \$1.011 } Bn$$

Over the 25 year initial term of the Fund CIGNA can experience growth of 6743.5%.

EXAMPLE WILLPOINT HEALTH NETWORKS INC.

At the end of the 2002 first quarter Wellpoint Health Networks had 13 million members. Wellpoint had first quarter 2002 net income of $141 million. Extrapolating Wellpoint could have, at least $564 million in 2002 net income. The Fund can add $1.460.16 billion to Wellpoint's bottom line in the Fund's first year. Assuming a P/E of 25 times, Wellpoint could see its market value increase by $36.504 billion as a direct result of the Fund.

Currently, Wellpoint has a market capitalization of $10.75 billion. The Fund can grow this market value to $47.254 billion, in the first year, equating to an increase in market value of 440%.

Year 2:
Market Value (MV) at the beginning of the year $47.254 Bn.
P/E Multiplier at end of the year $36.504 Bn.

$$\text{Beginning } MV \text{ (\$47.254 } Bn\text{)} + P/E \text{ Multiplier} \\ \text{(\$36.504 } Bn\text{)} = \text{End year } MV \text{ \$83.758 } Bn$$

Year 3:
Market Value (MV) at the beginning of the year $83.758 Bn.
P/E Multiplier at end of the year $36.504 Bn.

$$\text{Beginning } MV \text{ (\$83.758 } Bn\text{)} + P/E \text{ Multiplier} \\ \text{(\$36.504 } Bn\text{)} = \text{End year } MV \text{ \$120.262 } Bn$$

Year 4:
Market Value (MV) at the beginning of the year $120.262 Bn.
P/E Multiplier at end of the year $36.504 Bn.

$$\text{Beginning } MV \text{ (\$120.262 } Bn\text{)} + P/E \text{ Multiplier} \\ \text{(\$36.504 } Bn\text{)} = \text{End year } MV \text{ \$156.766 } Bn$$

Year 5:
Market Value (MV) at the beginning of the year $156.766 Bn.
P/E Multiplier at end of the year $36.504 Bn.

$$\text{Beginning } MV \text{ (\$156.766 } Bn\text{)} + P/E \text{ Multiplier} \\ \text{(\$36.504 } Bn\text{)} = \text{End year } MV \text{ \$193.27 } Bn$$

Year 6:
Market Value (MV) at the beginning of the year $193.27 Bn.
P/E Multiplier at end of the year $36.504 Bn.

$$\text{Beginning } MV \text{ (\$193.27 } Bn\text{)} + P/E \text{ Multiplier} \\ \text{(\$36.504 } Bn\text{)} = \text{End year } MV \text{ \$229.774 } Bn$$

Year 7:
Market Value (MV) at the beginning of the year $229.774 Bn.
P/E Multiplier at end of the year $36.504 Bn.

$$\text{Beginning } MV \text{ (\$229.774 } Bn\text{)} + P/E \text{ Multiplier} \\ \text{(\$36.504 } Bn\text{)} = \text{End year } MV \text{ \$266.278 } Bn$$

Year 8:
Market Value (MV) at the beginning of the year $266.278 Bn.
P/E Multiplier at end of the year $36.504 Bn.

$$\text{Beginning } MV \text{ (\$266.278 } Bn\text{)} + P/E \text{ Multiplier} \\ \text{(\$36.504 } Bn\text{)} = \text{End year } MV \text{ \$302.782 } Bn$$

Year 9:
Market Value (MV) at the beginning of the year $302.782 Bn.
P/E Multiplier at end of the year $36.504 Bn.

$$\text{Beginning } MV \text{ (\$302.782 } Bn\text{)} + P/E \text{ Multiplier} \\ \text{(\$36.504 } Bn\text{)} = \text{End year } MV \text{ \$339.286 } Bn$$

Year 10:
Market Value (MV) at the beginning of the year $339.286 Bn.
P/E Multiplier at end of the year $36.504 Bn.

$$\text{Beginning } MV \text{ (\$339.286 } Bn\text{)} + P/E \text{ Multiplier} \\ \text{(\$36.504 } Bn\text{)} = \text{End year } MV \text{ \$375.79 } Bn$$

Year 11:
Market Value (MV) at the beginning of the year $375.78 Bn.
P/E Multiplier at end of the year $36.504 Bn.

$$\text{Beginning } MV \text{ (\$375.79 } Bn\text{)} + P/E \text{ Multiplier} \\ \text{(\$36.504 } Bn\text{)} = \text{End year } MV \text{ \$412.294 } Bn$$

Year 12:
Market Value (MV) at the beginning of the year $412.294 Bn.
P/E Multiplier at end of the year $36.504 Bn.

$$\text{Beginning } MV \text{ (\$412.294 } Bn\text{)} + P/E \text{ Multiplier} \\ \text{(\$36.504 } Bn\text{)} = \text{End year } MV \text{ \$448.798 } Bn$$

Year 13:
Market Value (MV) at the beginning of the year $448.798 Bn.
P/E Multiplier at end of the year $36.504 Bn.

$$\text{Beginning } MV \text{ (\$448.798 } Bn\text{)} + P/E \text{ Multiplier} \\ \text{(\$36.504 } Bn\text{)} = \text{End year } MV \text{ \$485.302 } Bn$$

Year 14:
Market Value (MV) at the beginning of the year $485.302 Bn.
P/E Multiplier at end of the year $36.504 Bn.

$$\text{Beginning } MV \text{ (\$485.302 } Bn\text{)} + P/E \text{ Multiplier} \\ \text{(\$36.504 } Bn\text{)} = \text{End year } MV \text{ \$521.806 } Bn$$

Year 15:
Market Value (MV) at the beginning of the year $521.806 Bn.
P/E Multiplier at end of the year $36.504 Bn.

Beginning MV ($521.806 Bn)+P/E Multiplier ($36.504 Bn)=End year MV $558.31 Bn

Year 16:
Market Value (MV) at the beginning of the year $558.31 Bn.
P/E Multiplier at end of the year $36.504 Bn.

Beginning MV ($558.31 Bn)+P/E Multiplier ($36.504 Bn)=End year MV $594.814 Bn

Year 17:
Market Value (MV) at the beginning of the year $594.814 Bn.
P/E Multiplier at end of the year $36.504 Bn.

Beginning MV ($594.814 Bn)+P/E Multiplier ($36.504 Bn)=End year MV $631.31 Bn

Year 18:
Market Value (MV) at the beginning of the year $631.31 Bn.
P/E Multiplier at end of the year $36.504 Bn.

Beginning MV ($631.31 Bn)+P/E Multiplier ($36.504 Bn)=End year MV $667.822 Bn

Year 19:
Market Value (MV) at the beginning of the year $667.822 Bn.
P/E Multiplier at end of the year $36.504 Bn.

Beginning MV ($667.822 Bn)+P/E Multiplier ($36.504 Bn)=End year MV $704.326 Bn

Year 20:
Market Value (MV) at the beginning of the year $704.326 Bn.
P/E Multiplier at end of the year $36.504 Bn.

Beginning MV ($704.326 Bn)+P/E Multiplier ($36.504 Bn)=End year MV $740.83 Bn

Year 21:
Market Value (MV) at the beginning of the year $740.83 Bn.
P/E Multiplier at end of the year $36.504 Bn.

Beginning MV ($740.83 Bn)+P/E Multiplier ($36.504 Bn)=End year MV $777.334 Bn

Year 22:
Market Value (MV) at the beginning of the year $777.334 Bn.
P/E Multiplier at end of the year $36.504 Bn.

Beginning MV ($777.334 Bn)+P/E Multiplier ($36.504 Bn)=End year MV $813.838 Bn

Year 23:
Market Value (MV) at the beginning of the year $813.838 Bn.
P/E Multiplier at end of the year $36.504 Bn.

Beginning MV ($813.838 Bn)+P/E Multiplier ($36.504 Bn)=End year MV $850.342 Bn

Year 24:
Market Value (MV) at the beginning of the year $850.342 Bn.
P/E Multiplier at end of the year $36.504 Bn.

Beginning MV ($850.342 Bn)+P/E Multiplier ($36.504 Bn)=End year MV $886.846 Bn

Year 25:
Market Value (MV) at the beginning of the year $886.846 Bn.
P/E Multiplier at end of the year $36.504 Bn.

Beginning MV ($886.846 Bn)+P/E Multiplier ($36.504 Bn)=End year MV $923.35 Bn

Over the funds initial 25 year life Wellpoint Health Networks Inc., earnings will go from $10.75 BN to $923.35 Bn representing an increase in earnings of 8589%.

The Examples used herein illustrate the potential benefits of this invention. It will be realized that the numbers used herein are for illustrative purposes. Those in the field, however, will be able to realize that this invention can be used within a wide variety of parameters and fields not included herein.

Further, it will be realized that this invention can be applied outside of the HMO industry. Any industry facing huge reoccurring liabilities can benefit from this invention. For example, the asbestos industry or the food industry, which, according to a Wall Street Journal Article, may be the next industry facing reoccurring liability due to false advertising and non disclosure. See Shelly Branch, Food Makers Get Defensive About Gains in U.S. Obesity, Wall Street Journal, Jun. 13, 2002, at Advertising.

What is claimed is:

1. A method for paying liabilities comprising:
    paying into the fund during an accounting period,
    establishing liabilities against participants of the fund during the accounting period,
    paying out of the fund the established liabilities at the end of the accounting period, and
    distributing to participants of the fund computer calculated excesses in the fund at the end of the accounting period;
    wherein at least one of the participants comprises at least one customer member.

2. The method of claim 1, wherein participants of the fund pay into the fund at the beginning or during the accounting period.

3. The method of claim 1, wherein at least a portion of the established liabilities are payable to the at least one customer member.

4. The method of claim 1, wherein the customer members of the participants pay the participants who pay into the fund at the beginning or during the accounting period.

5. The method of claim 1, wherein the participants comprise Health Maintenance Organizations.

6. The method of claim 1, wherein the participants pay into the fund periodically during the accounting period.

7. The method of claim 1, wherein each participant of the fund pays into the fund at the beginning or during the accounting period an amount that is dependent upon the number of customer members of the participant.

8. The method of claim 2, wherein the amount paid into the fund by each participant is not dependent upon previous liabilities against the participant.

9. The method of claim 1, wherein a committee establishes the liabilities that are paid out of the fund.

10. The method of claim 1, wherein the established liabilities against participants includes litigation costs.

11. The method of claim 1, wherein interest is accrued on the fund during the accounting period.

12. The method of claim 11, wherein the interest is used to pay the costs of maintaining the fund.

13. A method for paying liabilities comprising:
   providing a fund,
   arranging for participants to pay into the fund during a first period of time,
   paying out of the fund established liabilities of the fund participants during a second period of time, and
   distributing to participants of the fund computer calculated excesses in the fund, wherein at least one of the participants comprises at least one customer member.

14. The method of claim 13, wherein at least a portion of the established liabilities are payable to the at least one customer member.

15. The method of claim 13, wherein the participants comprise Health Maintenance Organizations.

16. The method of claim 13, wherein the participants pay into the fund an amount that is dependent upon the number of customer members of the participant.

17. The method of claim 13, wherein the participants pay into the fund an amount that is not dependent upon previous liabilities against the participant.

18. The method of claim 13, wherein a committee establishes the liabilities that are paid out of the fund.

19. The method of claim 13 further comprising obtaining interest payments between the first period of time and the second period of time.

20. The method of claim 19, wherein the interest is used to pay the costs of maintaining the fund.

* * * * *

UNITED STATES PATENT AND TRADEMARK OFFICE
CERTIFICATE OF CORRECTION

PATENT NO. : 7,246,089 B2 Page 1 of 1
APPLICATION NO. : 10/170421
DATED : July 17, 2007
INVENTOR(S) : Joel D. Hoppenstein It is certified that error appears in the above-identified patent and that said Letters Patent is hereby corrected as shown below:

Column 15, line 32, delete "WILLPOINT" and replace with

--WELLPOINT--.

Signed and Sealed this

Fourth Day of December, 2007

JON W. DUDAS
*Director of the United States Patent and Trademark Office*